United States Patent
Heronimus et al.

(12) 
(10) Patent No.: US 6,691,121 B1
(45) Date of Patent: Feb. 10, 2004

(54) METHOD AND APPARATUS FOR ONLINE AND DYNAMIC EXTENSION OF IMS DATA ENTRY DATABASES

(75) Inventors: Scott D. Heronimus, Sugar Land, TX (US); John F. Mahoney, Sugar Land, TX (US)

(73) Assignee: BMC Software, Inc., Houston, TX (US)

( * ) Notice: Subject to any disclaimer, the term of this patent is extended or adjusted under 35 U.S.C. 154(b) by 469 days.

(21) Appl. No.: 09/698,449

(22) Filed: Oct. 27, 2000

(51) Int. Cl.$^7$ ................................. G06F 17/30

(52) U.S. Cl. ............... 707/101; 707/8; 707/205; 711/171

(58) Field of Search ................ 707/205, 100, 707/8; 711/114, 100, 171

(56) References Cited

U.S. PATENT DOCUMENTS

| | | | | |
|---|---|---|---|---|
| 5,581,737 A | * | 12/1996 | Dahlen et al. | 707/101 |
| 5,615,352 A | * | 3/1997 | Jacobson et al. | 711/114 |
| 5,812,849 A | * | 9/1998 | Nykiel et al. | 717/101 |
| 5,832,509 A | * | 11/1998 | Mortis et al. | 707/200 |
| 5,897,661 A | * | 4/1999 | Baranovsky et al. | 707/205 |
| 5,946,686 A | * | 8/1999 | Schmuck et al. | 707/10 |
| 5,956,745 A | * | 9/1999 | Bradford et al. | 707/205 |
| 5,991,761 A | * | 11/1999 | Mahoney et al. | 707/100 |
| 6,144,970 A | * | 11/2000 | Bonner et al. | 707/206 |
| 6,237,036 B1 | * | 5/2001 | Ueno et al. | 709/225 |
| 6,311,232 B1 | * | 10/2001 | Cagle et al. | 710/8 |
| 6,411,964 B1 | * | 6/2002 | Iyer et al. | 707/200 |
| 6,442,661 B1 | * | 8/2002 | Dreszer | 707/205 |
| 6,446,183 B1 | * | 9/2002 | Challenger et al. | 707/205 |
| 6,453,383 B1 | * | 9/2002 | Stoddard et al. | 707/205 |

OTHER PUBLICATIONS

IBM Technical Disclosure Bulletin Data Space Manager, vol. 25 Issue 11A p. 5456–5459 1983.*
IBM International Sytems Centers–Guide to IMS/VS V1 R3 Data Entry Data Base Facility GG24–1633–0. 1984.*
Sockut Gary H. et al. Database Reorganization–Principles and Practice ACM 1979 p. 372–395.*
Lomet David B. A Simple Bounded Disorder File Organization with Good Performance Vol 13 No 4 ACM 1998 p. 525–551.*

* cited by examiner

Primary Examiner—Kim Vu
Assistant Examiner—Monplaisir Hamilton
(74) Attorney, Agent, or Firm—Wong, Cabello, Lutsch, Rutherford & Brucculeri, L.L.P.

(57) ABSTRACT

A method is disclosed for extending data Areas in a DEDB database while the database is online. Specifically, the IOVF and SDEP data portions can be increased or extended while the database is active to the control region. In one embodiment, the method includes (a) receiving a requested extension size; (b) acquiring additional storage from the operating system; (c) formatting the acquired additional storage as DEDB control intervals; and (d) updating a DEDB areas control list (DMAC) to reflect the increased size of the DEDB Areas. While these actions are performed, regions of the data areas currently holding data are not modified and remain available for normal DEDB activity. When block level sharing is enabled, the current IMS process notifies the other IMS processes engaged in block level sharing to prepare for the extension of the DEDB areas prior to the acquisition of additional storage from the operating system. The other IMS processes are also notified to commit to the extension after the acquisition is accomplished. The current IMS process then proceeds with the formatting and updating. The current process preferably locks the DMAC only during the acquisition and during the updating of the DMAC.

24 Claims, 8 Drawing Sheets

IOVF EXTENSION (WITH SDEPS)

FIG. 4C

ONLINE EXTEND BLS
INITIALIZATION

METHOD AND APPARATUS FOR ONLINE AND DYNAMIC EXTENSION OF IMS DATA ENTRY DATABASES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention relates to a method for performing online extension of certain data storage areas in an IBM IMS Data Entry Database. More particularly, this invention relates to a method for extending data areas in a Data Entry Database while the database is online. Specifically, the independent overflow portion and the sequential dependent portion data areas of a Data Entry Database can be increased or extended while the database is active to the IMS control region. This method also works for offline database reorganization.

2. Background of the Invention

IMS is one of the oldest and most widely used database systems. It runs under the OS/390 operating system on large IBM 370 and 370-like machines. IMS is based on the hierarchical data model. Queries on the IMS databases are issued through embedded calls in a host language. The embedded calls are part of the IMS database language DL/I.

Because performance is critically important in large databases, IMS allows the database designer a large number of options in the data definition language. The database designer defines a physical hierarchy as the database scheme. Several subschemes may be defined by constructing a logical hierarchy from the segment types comprising the scheme. There is a variety of options available in the data definition language (block sizes, special pointer fields, etc.) that allows the database administrator to "tune" the system for improved performance.

Figure 1:
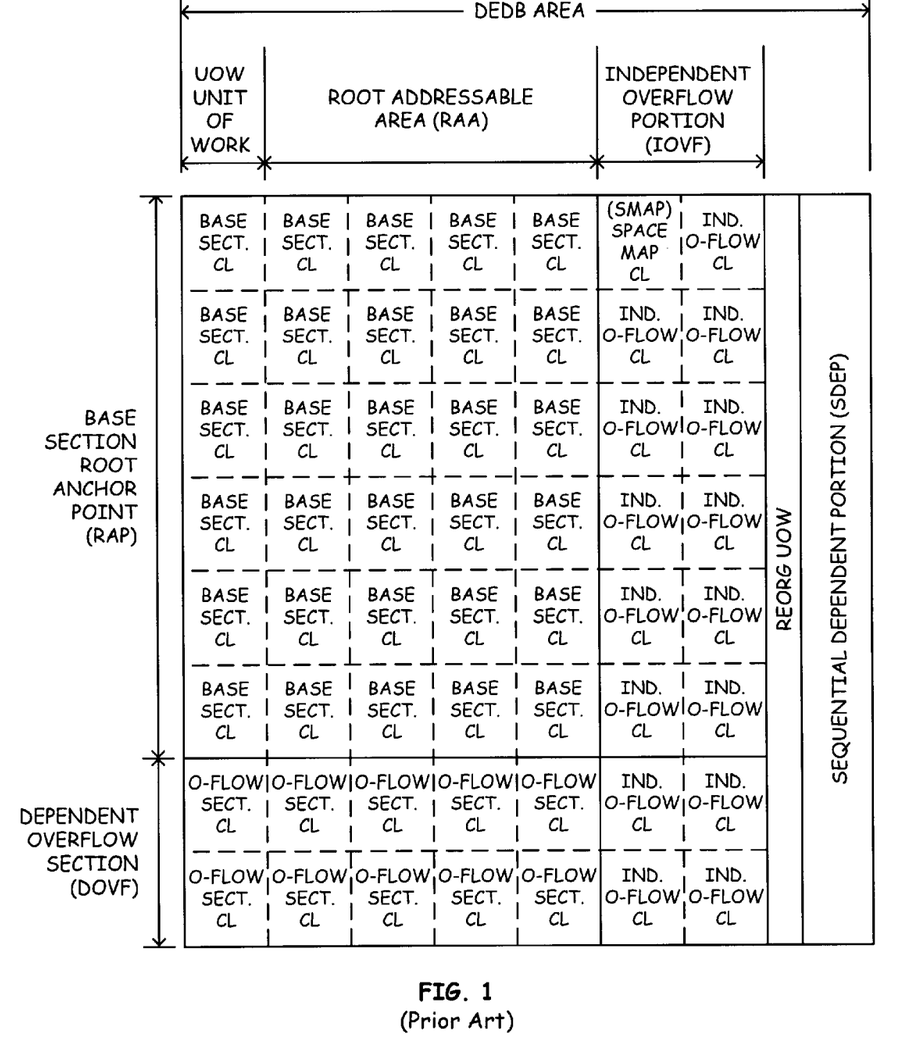
FIG. 1 is a block diagram of an Area in a DEDB.

A hierarchical database consists of a collection of segments that are connected to each other with relative byte address (RBA) pointers. Each segment is a collection of fields (attributes), each of which contains only one data value. Each pointer provides an association between precisely two segments. One well-known type of IMS hierarchical database is the data entry database ("DEDB"). A DEDB is a set of database records stored in a collection of data set partitions called Areas. A DEDB can accommodate up to 240 Areas. An Area contains a range of database records. As shown in FIG. 1, an Area is divided into three portions: a root addressable portion, an independent overflow portion, and a sequential dependent portion.

As shown in FIG. 1, the root addressable portion of an Area contains a logical concept call a unit-of-work ("UOW"). Each Area may contain up to 32K UOWs. A UOW consists of a user-specified number of physically contiguous control intervals. A control interval is the unit of transfer between an external storage device and a computer.

A UOW is divided into a base section and a dependent overflow section. The base section contains control intervals that are used for the storage of data. The dependent overflow section of a UOW is used to store data after the base section control intervals of the UOW are full, i.e., are unable to satisfy a request for space.

As shown in FIG. 1, the independent over-flow ("IOVF") portion of an Area also contains control intervals. These control intervals may be used to logically increase the size of a particular UOW. Thus, the IOVF control intervals are logical extensions of the dependent overflow section of a particular UOW. However, once a control interval has been used to increase the dependent overflow section of a particular UOW, only data associated with that UOW may be stored therein. Thus, an IOVF control interval that is allocated to a particular UOW may be considered to be "owned" by that UOW.

The first control interval in the IOVF portion contains a space map ("SMAP"). This SMAP indicates which UOWs own the following 119 control intervals in the IOVF portion. There is another SMAP for every 120 IOVF control intervals, i.e., the $1^{st}$, $121^{st}$, $241^{st}$, etc. control intervals in the IOVF portion are SMAP control intervals.

The sequential dependent portion ("SDEP") of an Area contains space for storing segment data in a time-ordered sequence without regard to the UOW containing the root segment. The SDEP is used as a circular queue for data storage. The SDEP facilitates rapid insertion of data segments into the DEDB. DEDB puts such data segments in SDEP in the order it received them. This allows fast entry of data segments, since data segments are stored one after another. However, retrieving logically related data records is not efficient or fast, because such related records may be physically scattered throughout the SDEP and not in a logical order.

When data is stored in a DEDB, the data is associated with a particular UOW. Initially, the UOW's basic section control intervals will be empty. Thus, the UOW will contain base section control intervals that may be used to store the data. However, as more data is associated with a particular UOW, the base section control intervals will become full.

If additional data is to be associated with a UOW that contains full base section control intervals, then the first control interval within the dependent overflow section of the associated UOW is utilized to store the data. If the first control interval is also full, then the second control interval within the overflow section will be utilized to store the data. Additional data may be similarly associated with the UOW until all control intervals within the dependent overflow section are full.

If additional data is to be associated with a UOW and no space can be found in a UOW's dependent overflow section, then a SMAP control interval in the independent overflow portion of the Area will be used to acquire any available IOVF control intervals. After these control intervals are full, another SMAP control interval will be used to allocate additional IOVF control intervals. This sequence continues until no unallocated IOVF control intervals are available. When this occurs, the DEDB Area is full.

Figure 2:
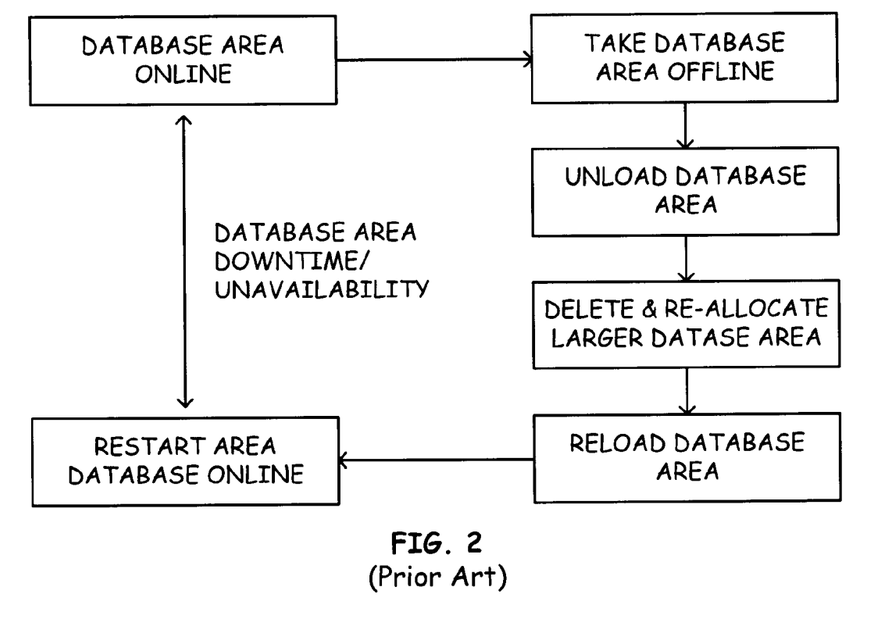
FIG. 2 is a block diagram of a prior art method for increasing space in a DEDB.

FIG. 2 illustrates the prior art for increasing space in a DEDB Area. Once the DEDB Area is full, i.e., IOVF or SDEP portions are full, then the DEDB Area must be taken offline and the segment data unloaded. Next, the DEDB Area data set is deleted and re-allocated to allow for more storage space. Then the segment data is reloaded into the newly defined and allocated DEDB Area. Then the DEDB Area is brought online and available for use. While the DEDB is offline, no access to the DEDB is possible, which creates downtime and system unavailability.

There has been a long-standing need to be able to do DEDB Area data set extents while online. DEDBs provide high data storage capacity for continuous support of online activities. DEDB's Areas are pre-defined and pre-formatted and can not be increased, i.e., extended, while the database is online and running. Therefore, data area must be carefully monitored to avoid running out of space; DEDBs do not support dynamic data set extensions, i.e., storage space cannot be increased while the DEDB Area is online and running.

IBM has a method for increasing physical storage capacity that requires taking the database area offline, making changes to space parameters, unloading and reloading the database Area and then putting the Area back online. This is a cumbersome and time consuming process and not online. Alternatively, the Area can be reorganized, either online or offline, and space may be reclaimed during the reorganization. However, reorganization is time consuming and resource intensive. In addition, reorganization may not free up sufficient space.

As previously stated, DEDBs require vigilant space monitoring because they do not support dynamic area data set extension. If a DEDB Area data set should suffer space problems because the independent overflow or sequential dependent portion has been thoroughly exhausted, then the business application will incur an expensive outage. Resolving a full Area condition has historically been a disruptive and protracted process. The regular procedure of unloading and reloading all the segment data can take substantial time causing significant application downtime.

DEDBs, like all IMS databases, are defined by the Database Description ("DBD") control block. The AREA macros are used in the DBD to describe the number, name and size attributes of each Area within the database. The UOW keyword specifies the number of root anchor point ("RAP") and dependent overflow ("DOVF") control intervals allocated to a single UOW. The ROOT keyword designates the size of the root addressable area ("RAA") and the IOVF in terms of UOWs. The SDEP portion of an Area is the balance of space between the reorganization UOW and the end of the Area data set. Therefore, the size of RAA, IOVF and SDEP portions are a function of the UOW, ROOT and data set allocation parameter values.

Starting with IMS version 3.1, the online Area open process has natively allowed DEDB Areas whose DEDB Areas Control List (DMAC) control interval described an IOVF portion that was larger than the actual DBD definition. *The IMS/ESA Version 3 Database Administration Guide* (IBM publication SC26-4281-01) outlines a multiple step procedure for extending a DEDB Area data set and placing it back online. This procedure describes the necessary steps for modifying the DBD by proportionately increasing the Area's ROOT parameter values. The overall size of the RAA cannot be changed in any way, nor can the size of the IOVF be reduced. The SDEP portion can be varied, but should be sized to accommodate all preexisting segments. After regenerating the DBD and Application Control Block (ACB), the segment data in the Area is then unloaded and subsequently reloaded, using the new ACB, into a larger sized Area data set. This new Area data set is then placed back online without having to swap control blocks or cycle the entire subsystem. This prior art method is a cumbersome procedure, error-prone, resource-intensive and, more importantly, too slow. Thus, there is a need for a method for extending the IOVF and SDEP data portions in a DEDB while the database is online and running.

BRIEF SUMMARY OF THE INVENTION

A method is disclosed for extending data Areas in a DEDB database while the database is online. Specifically, the IOVF and SDEP data portions can be increased or extended while the database is active to the control region. This method also works for offline database reorganization.

In one embodiment, the method includes (a) receiving a requested extension size; (b) acquiring additional storage from the operating system; (c) formatting the acquired additional storage as DEDB control intervals; and (d) updating a DEDB areas control list (DMAC) to reflect the increased size of the DEDB areas. While these actions are performed, regions of the data areas currently holding data are not modified and remain available for normal DEDB activity. When block level sharing is enabled, the current IMS process notifies the other IMS processes engaged in block level sharing to prepare for the extension of the DEDB Areas prior to the acquisition of additional storage from the operating system. The other IMS processes are also notified to commit to the extension after the acquisition is accomplished. The current IMS process then proceeds with the formatting and updating. The current process preferably locks the DMAC only during the acquisition and during the updating of the DMAC. The present invention further contemplates information media that conveys software for implementing the method disclosed herein.

BRIEF DESCRIPTION OF THE DRAWINGS

A better understanding of the present invention can be obtained when the following detailed description of the preferred embodiments is considered in conjunction with.the following drawings.

DETAILED DESCRIPTION OF THE PREFERRED EMBODIMENTS

Extending an Area data set with a utility program that enables online and dynamic extension of DEDB is a much faster solution for physically increasing the available IOVF or SDEP space within a DEDB Area. The extension process only needs to format the enlarged portion of the Area data set and update the DMAC to reflect the new size. The preferred embodiment of the present invention eliminates the processing overhead of reading and rewriting all the segment data in the Area and limits the I/O activity to just the Area portion that is changing. These combined factors give the present invention a significant speed advantage over the procedural method of the previously described prior art method.

The objectives of the present invention include providing a method and system for online extension of SDEP portion, online extension of IOVF portion, and to accomplish the foregoing in a data sharing environment (i.e., block level sharing of data) with multiple IMS subsystems.

Figure 3:
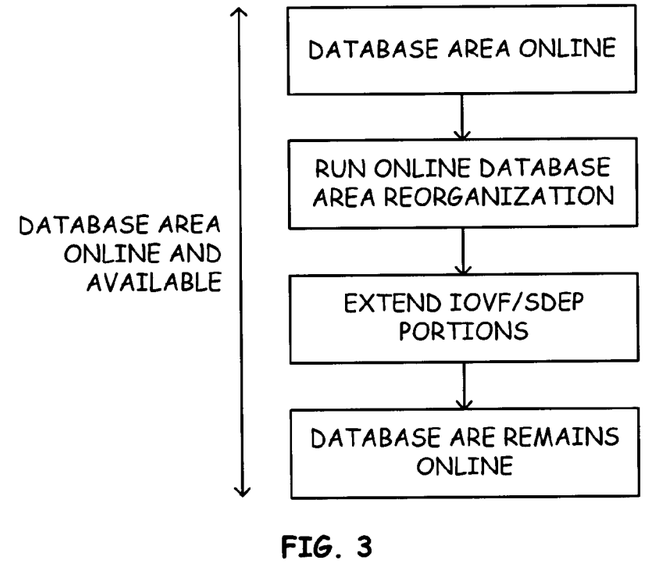
FIG. 3 is a block diagram illustrating a new method of online extension of data storage in a DEDB.

Referring now to FIG. 3, a new method of online extension of Area storage in a DEDB is illustrated. This method allows the DEDB Area to stay online and active while the data extension is performed. This drawing illustrates that the DEDB is online and active while the program Online Reorganization is used to extend the IOVF or SDEP portions. There is no downtime and the database area remains available.

Figure 4A:
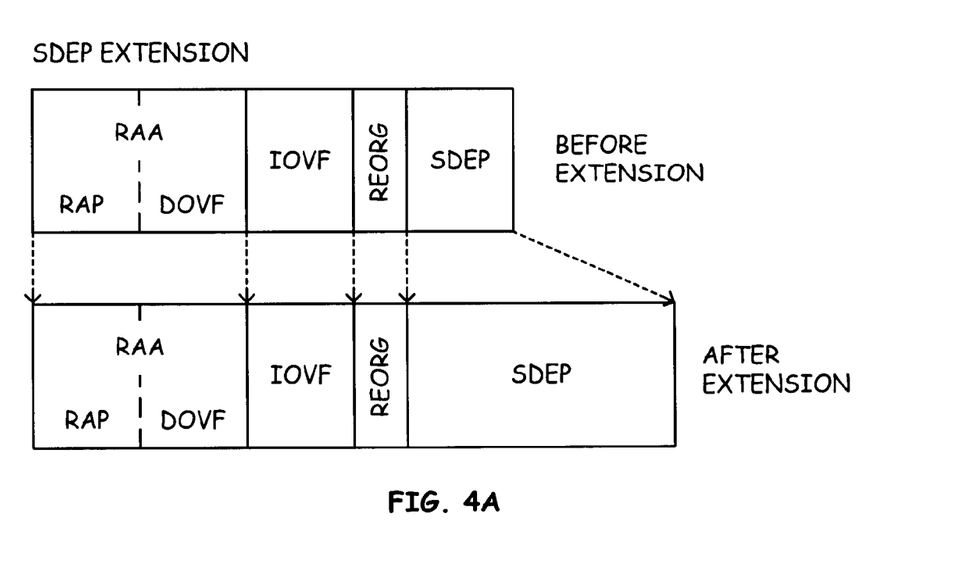
FIG. 4a is a block diagram of a method of SDEP extension.

Referring now to FIG. 4a, a method of SDEP extension under the principles of the present invention is illustrated. This drawing shows how the original SDEP is increased in size while all the other portions remain the same. Once the data set extent has been taken, all the newly addressable space needs to be properly formatted and written as empty SDEP control intervals. The DMAC (described by macro DBFDMAC) control interval should then be updated and rewritten to reflect the new physical boundary of the Area. The field DMACFBAD should be changed to the block number representation of what is now the Area data set's new high used relative byte address (RBA). The SDEP segments are frequently found to be in a logically wrapped condition, that is where the logical beginning RBA (DMACXVAL) is greater than the logical ending RBA (DMACNXTS). In this case, the additional space will only be available to the application after running the DEDB Sequential Dependent Delete utility (DBFUMDL0).

Figure 4B:
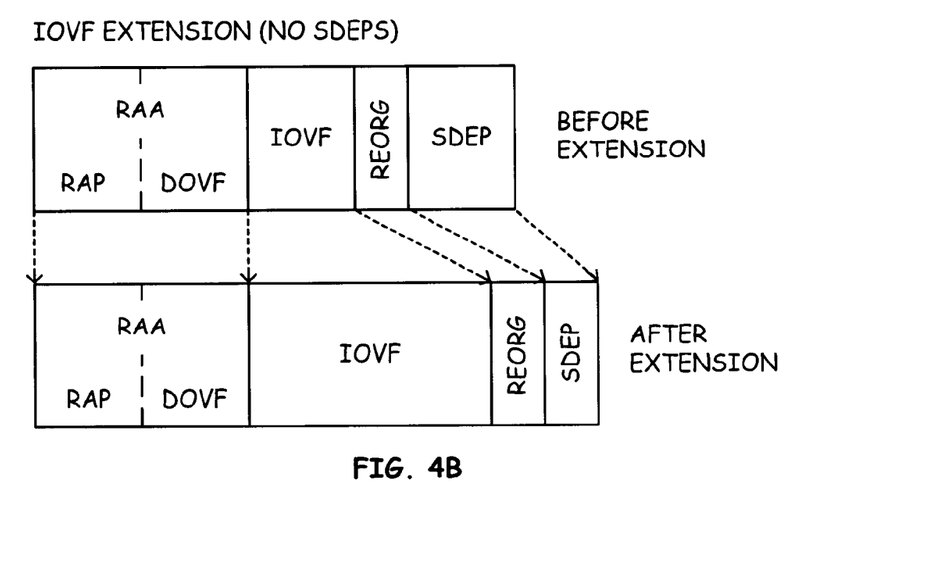
FIG. 4b is a block diagram of a method of IOVF extension without defined SDEP.

Now referring to FIG. 4b, a method of IOVF extension, with no defined SDEP, under the principles of the present invention is illustrated. Although an SDEP segment is not defined in the DBD, IMS will consider the portion normally used for SDEP as SDEP, as shown in the "before" picture in FIG. 4b. As shown, during the IOVF extension, the unused SDEP portion of the Area will be displaced by new IOVF and whatever remaining space of the Area is left after the IOVF extension will be considered SDEP.

Still referring to FIG. 4b, in extending the IOVF portion of an Area that does not have a defined SDEP segment, after the data set extent is taken, a section of the Area should be reformatted from the beginning of the old reorganization UOW to the end of the new extent. Because the IOVF size of an Area is defined in terms of UOW's, the additional IOVF space can only be increased by multiples of the UOW. As the newly formatted and empty IOVF data control intervals are successively written, new SMAP control intervals must also be progressively written at overflow unit intervals (DMACIOUS). The reorganization UOW should then be formatted and written at the end of the new IOVF portion. Although the DEDB does not have a defined SDEP segment any remaining space between the reorganization UOW and the end of the Area data set should be formatted and written with empty SDEP control intervals.

Still referring to FIG. 4b, once the reformatting process is complete, the formerly last SMAP control interval should be revised to encompass any newly addressable IOVF control intervals and then rewritten. The DMAC control interval should be refreshed and rewritten to show the new physical boundaries and block counts within the Area. Several of the DMAC fields need to be updated. DMACFBAD should be changed to the block number representation of what is now the Area data set's new high used RBA. The number of newly formatted SMAP control intervals should be added to DMACOUNO. DMACOCNT should include the number of IOVF data control intervals. DMACFROW needs to have the beginning relative block number of the new reorganization UOW. Likewise, DMACFSEQ needs the relative block number of the first SDEP control interval. Finally, DMACXVAL and DMACNXTS should respectively reflect the new SDEP logical beginning and logical ending RBA's.

Figure 4C:
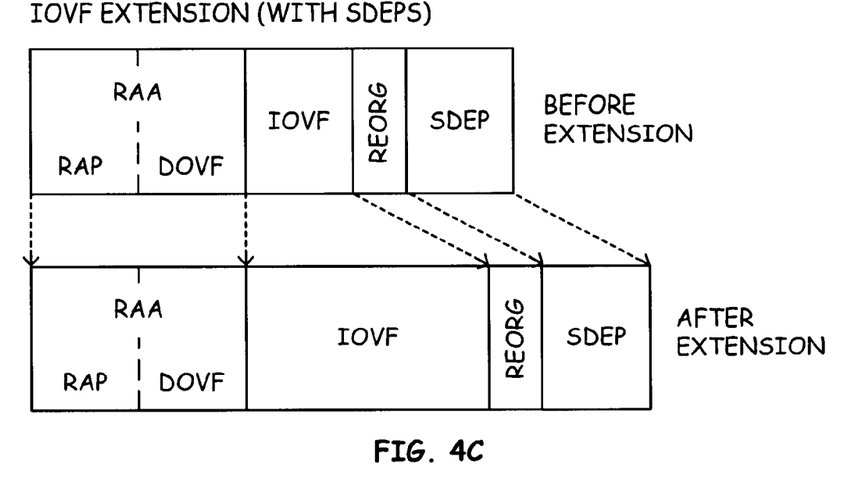
FIG. 4c is a block diagram of a method of IOVF extension with defined SDEP.

Now referring to FIG. 4c, a method of IOVF extension, with defined SDEP, under the principles of the present invention is illustrated. Extending the IOVF portion of an Area with a defined SDEP segment is a hybrid between the two above-described processes. Though this process is technically feasible, the convenience of retaining the SDEP segments in the Area will forfeit most of the performance benefits. Therefore, running the DEDB Sequential Dependent Scan utility (DBFUMSC0) and deleting the SDEP segments prior to the extension is recommended. The process starts the same as an ordinary SDEP extension by taking a data set extent and properly formatting and writing empty SDEP control intervals to the newly addressable space. If all the SDEP segments had been deleted, then the rest of this extension process would be the same as an ordinary IOVF extension.

Still referring to FIG. 4c, if the SDEP segments had been retained, then all of the previous SDEP control intervals need to be shifted down to the newly formatted SDEP control intervals. The sequential dependent physical twin pointers, in the SDEP segments, need to be recalculated by the size of the IOVF increase. This can be done while the SDEP control intervals are translated, one at a time, from the old physical end (DMACFBAD) back through the old physical beginning (DMACFSEQ). Then, the section between the old reorganization UOW (DMACFROW) and the new SDEP physical beginning (DMACFSEQ) needs to be reformatted into valid IOVF data, SMAP and reorganization UOW control intervals. The previously last SMAP control interval should then be revised to include any newly addressable IOVF control intervals and rewritten. Now the DMAC control interval needs to be updated in the same way as a regular IOVF extension and recommitted. Finally, all the sequential dependent physical child first pointers in the root segment prefixes need to be adjusted by the size of the IOVF increase to reflect the new SDEP segment locations. Given the breadth of this type of processing, it is probably furnished better from within a database reorganization utility.

Figure 5:
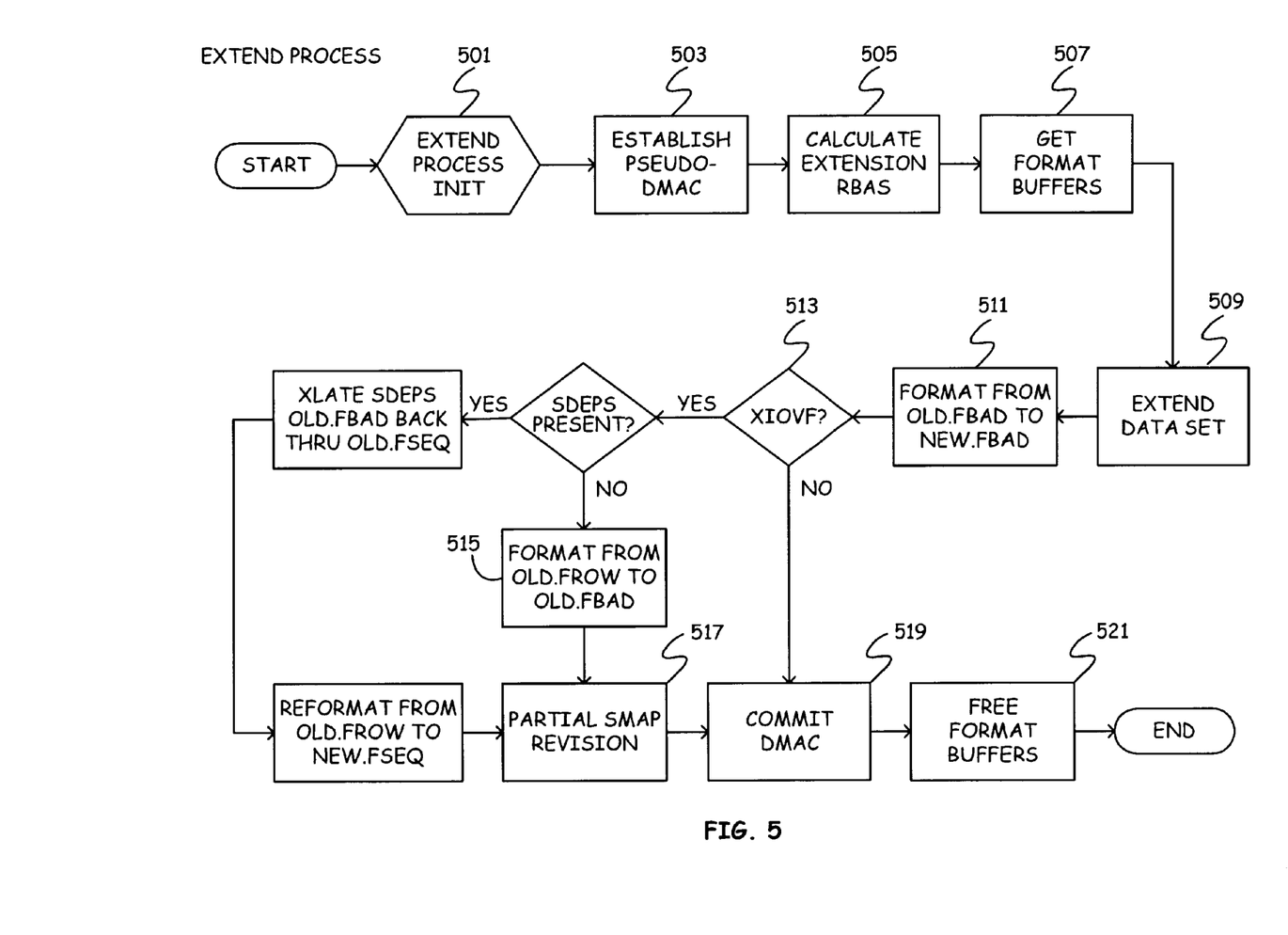
FIG. 5 is a flow chart showing the "logical" extend process.

Now referring to FIG. 5, the "logical" extend process is illustrated through a flow chart. Process initialization 501 starts the extend process. Creating a pseudo DMAC 503, which is a working copy of the DMAC, enables modifying the DMAC without impacting the real DMAC. Next, calculate DMAC extension values 505 (or extension RBAs) based on the requested extension size, which is expressed in terms of UOW units. The UOW number is then translated to actual RBAs needed. Format buffers are acquired 507 (essentially, a work area) for IMS to write formatted control intervals. Next, the actual physical extend process is started 509 by acquiring external storage from the operating system. This process is explained in further detail below under the discussion for FIG. 7a.

The appropriate IMS service is then called to write formatted control intervals 511 starting from the old end of file (DMAC FBAD) to the new end of file (DMAC FBAD) of the extended Area. Next, write what was at the old end to the new end, basically moving information associated with the old SDEP to the end of the new Area.

Still referring to FIG. 5, now determine whether an IOVF extension 513 is requested. If IOVF extension is requested 515, then format the new IOVF portion, which previously was the SDEP portion. This is accomplished by formatting the old reorg UOW to the old EOF (old.FROW to old.FBAD). Next, revise the partial SMAP 517 to reflect new IOVF that has been added and to update SMAP information. Now the DMAC is committed 519. This makes the extension permanent by updating the real DMAC with changes from the copied DMAC. This process tells IMS that the extension has been completed. Next, free the format buffers 521 that were allocated in block 507. If IOVF extension is not requested, then skip to the step for committing the DMAC 519 and continue with the remaining steps as described above.

Figure 6:
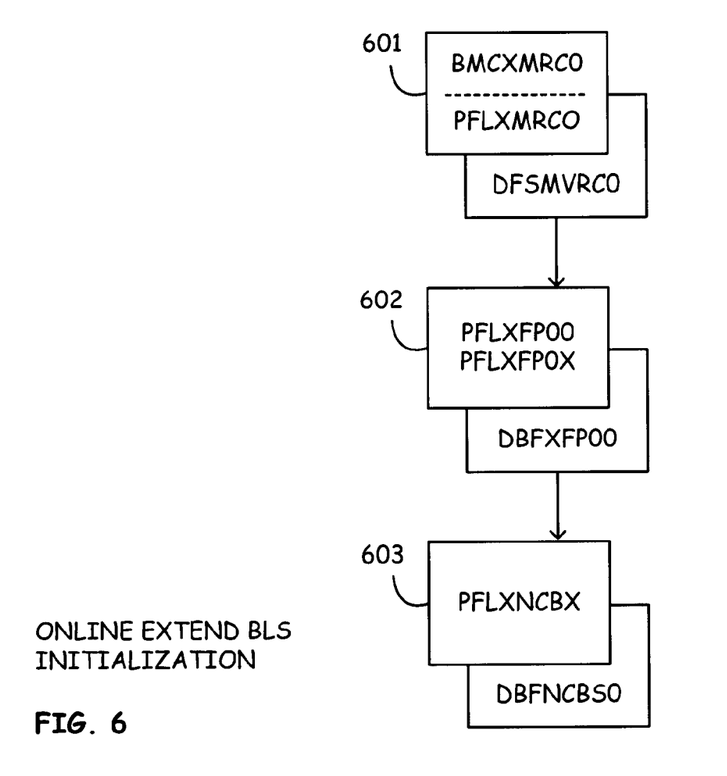
FIG. 6 is a block diagram of the initialization steps to enable block level sharing during online extension of a DEBD.

Now referring to FIG. 6, the block diagram illustrates the initialization steps to enable block level sharing during online extension of a DEBD Area. This method allows multiple IMS to use the extended Area in the DEDB. To accomplish this, certain program modules need to be hooked into IMS to enable communication among the shared IMS to support the extension of block level sharing of Areas. These modules include BMCXMRC0 601, PFLXFP0 603 and PFLXNCBx 605. Module BMCXMRC0 601, the region controller front-end, calls PFLXMRC0 which loads PFLXFP00 to hook IMS's fast path initialization. Module PFLXFP0x 603 hooks DBFXFP00 to front-end IMS' fast path notify control block processor. Finally, module PFLX-NCBx 605 intercepts the notify control block processor within the IMS nucleus.

Figure 7A:
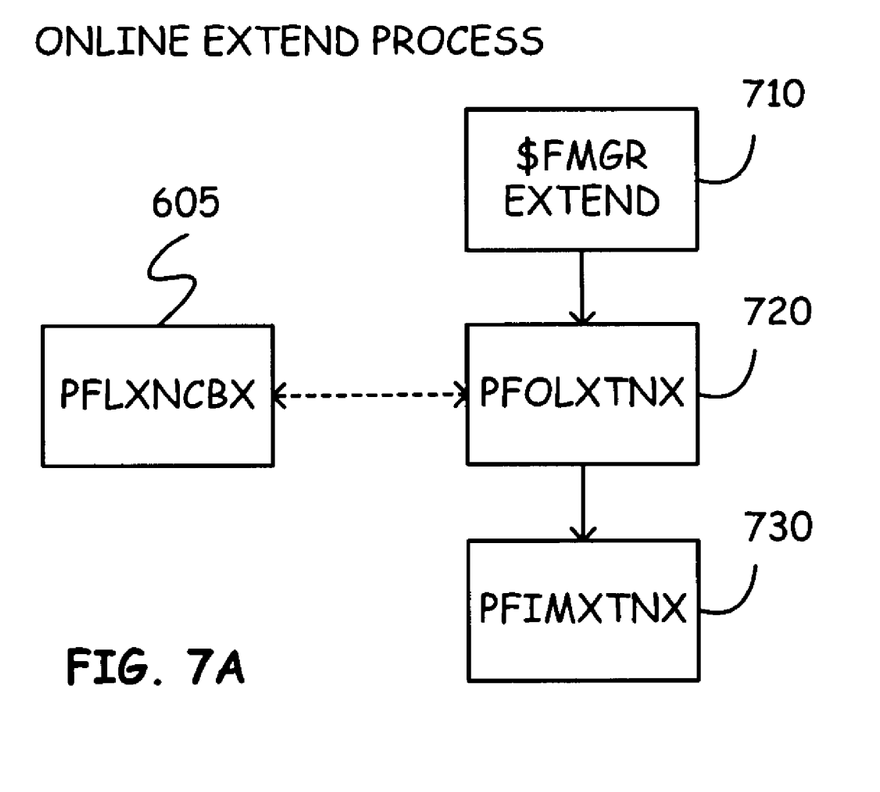
FIG. 7a is a block diagram depicting a detailed illustration of the actual physical extend process 509 in FIG. 5 and the interaction with other IMSs.

Now referring to FIG. 7a, a further detailed illustration of the actual physical extend process 509 in FIG. 5 (overview of the "logical" extend process) is presented here, along with its interaction with other IMS. Module $FMGR extend 710 is the file manager vector and the entry point to start the extension process from within the online reorganization process. Module PFOLXTNx 720 acts as the interface or execution router to direct the overall process. Module PFOLXTNx 720 interfaces between the IFP and the control region. Module PFIMXTNx 730 performs the actual extension. Module PFIMXTNx 730 is the ECSA resident module that switches to the control region extends the dataset and schedules the SRB to format the new extent. Module PFLX-NCBx 605 is the control region hook, in all partner IMSs within a sharing environment, that refreshes Media Manager control blocks.

Figure 7B:
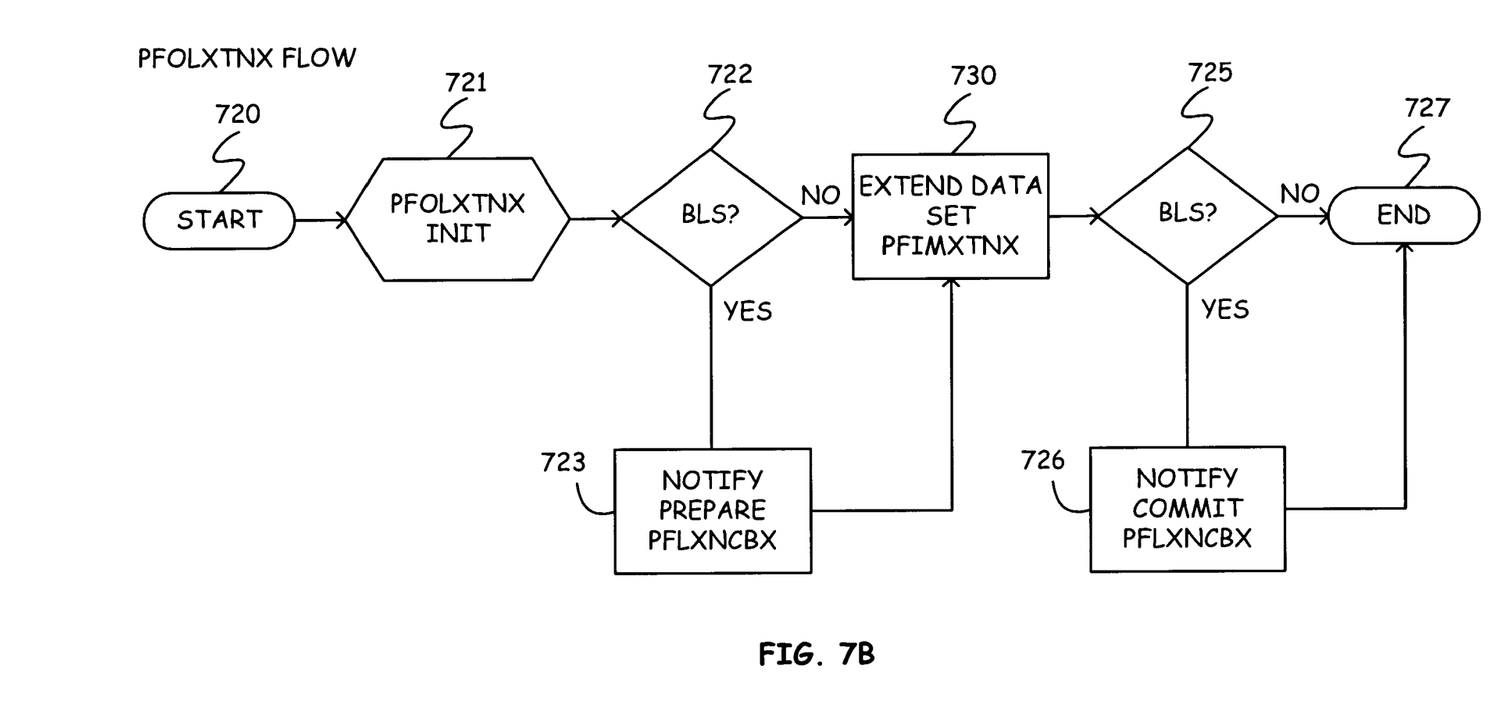
FIG. 7b is a flow chart depicting a detailed illustration of the physical extent process within one IMS.

Now referring to FIG. 7b, a further detailed illustration of the physical extent process within one IMS is presented here. Module PFOLXTNx Init 721 in FIG. 7b is the initialization entry point from Module PFOLXTNx 720 in FIG. 7a. As previously stated, Module PFOLXTNx 720 in FIG. 7a acts as the interface or execution router to direct the overall process and it interfaces between the IFP and the control region. A check for block level sharing 722 is performed. If block level sharing is active, then Module PFLXNCBx 723 notifies all partner IMS systems and prepares for online extension. If block level sharing is not active or after Module PFLXNCBx 723 completes its process, control is transferred to Module PFIMXTNx 730 which performs the actual extension. The processing of Module PFIMXTNx 730 is explained in further detail below under discussion of FIG. 8. After Module PFIMXTNx 730 completes its processing, a second check for block level sharing 725 is performed. If block level sharing is active, then Module PFLXNCBx 726 notifies all IMS sharing partners to commit to the extend by refreshing their local copies of the Area dataset's extent block information. If block level sharing is not active or after Module PFLXNCBx 726 completes its notification to commit, then control is transferred to the Exit routine 727.

Figure 8:
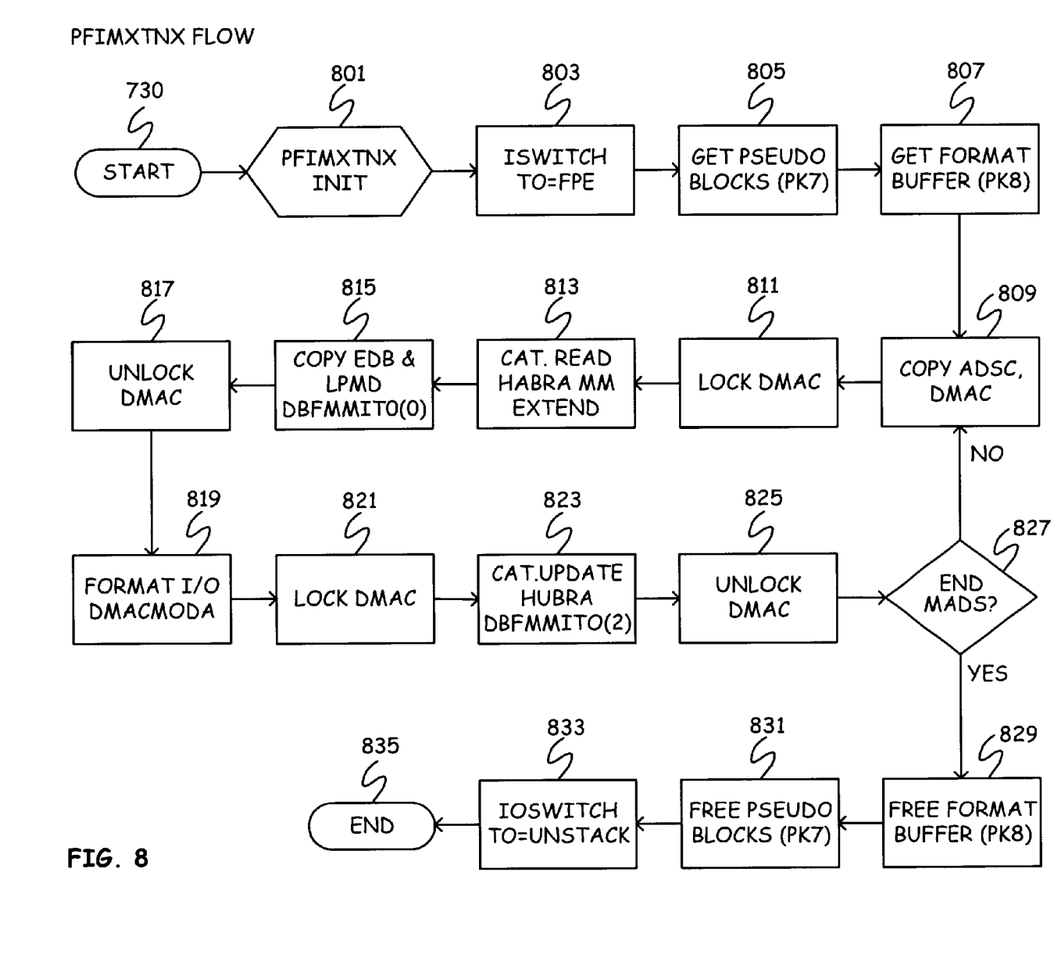
FIG. 8 is a detailed flow chart of the actual physical extend process.

Now referring to FIG. 8, a further detailed illustration of the actual extension is presented here. As previously stated, Module PFIMXTNx 730 in FIG. 7b performs the actual physical extend. The following discussion provides details of Module PFIMXTNx 730 processing. The process begins with execution of the initialization routine 801. Next, Module PFIMXTNx 730 switches program execution to the IMS control region 803 because the IMS address space owns the data sets that are to be extended. The module then acquires storage to build pseudo control blocks 805. This serves as the scratch pad work area. Next, buffers are acquired 807 to write formatted control intervals. The process then copies IMS control blocks ADSC and DMAC 809 into pseudo control blocks 805. The DMAC is now locked 811 to prevent any changes to the DMAC during the extend process. Next, the current high allocated RBA ("HARBA") is checked 813 to determine actual required space for extension. Once the required space is determined, the actual extend is performed by calling IBM's media manager services.

Still referring to FIG. 8, the process then calls IMS Module DBFMMIT0 815 to copy control blocks EDB and LPMB created by IBM's media manager in connection with the extend and to copy the control blocks to the common storage area ("CSA"). Next, the DMAC is unlocked 817 because the extend has been done. Now IMS Module DMACMODA 819 is called to perform the initial format write for the new extent. Once the initial format is complete, the DMAC is locked 821 again to update the DMAC information. The process now calls IMS Module DBFM-MIT0 823 to update the high use RBA ("HURBA") for the Area to be the same as HARBA 813, thus reflecting the true extended Area. Once HURBA has been updated, DMAC is unlocked 825. A check is now performed to determine whether there are multiple Area data sets ("MADS") 827. If MADS exist that have not been extended yet, then go back to step 809 and repeat the above procedure to extend any remaining MADS. Once all MADS have been extended, free format buffers 829 that were acquired in step 807 and free pseudo blocks 831 that were acquired in step 805. Now switch program execution back to IFP region or dependent region 833 and exit 835 the process.

As one of ordinary skill in the art will appreciate, the use of IBM's Media Manager to perform the physical extend and other functions described in the preferred embodiment is not the only way to perform such functions. Other methods or system utilities may be used to perform equivalent functions. Furthermore, as one of ordinary skill will recognize, the present invention's utility or application is not limited to the present state of the art hardware and software (such as the OS/390 operating system). The present invention's application extends to any future computer hardware architecture (such as the forthcoming 64-bit G7 processor) and any future software architecture or operating system capable of supporting DEDBs.

One advantage of the present invention over the prior art is the ability to allow the IMS database Area to remain online while increasing data capacity. Another advantage is that the present invention is faster than the prior art. A further advantage is that the method and system of the present invention works in a data-sharing environment where there are multiple IMSs running and sharing data.

Any of the foregoing embodiments may be implemented by programming a suitable general-purpose machine having appropriate hardware. The machine may comprise a single computer. Alternatively, the machine may comprise a plurality of computers connected by a communications link.

The programming may be accomplished through the use of a program storage device readable by the machine and encoding a program of instructions executable by the machine for performing the operations described above. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions is immaterial.

It will be appreciated by those of ordinary skill having the benefit of this disclosure that the illustrative embodiments described above are capable of numerous variations without departing from the scope and spirit of the invention. Accordingly, the exclusive rights sought to be patented are as described in the claims below.

What is claimed is:

1. A method of extending data storage areas in a data entry database, the method comprising:

receiving a requested extension size;

acquiring additional storage from an operating system sufficient to hold an additional number of control intervals;

formatting the acquired additional storage as data entry database control intervals; and updating a data entry database areas control list (DMAC) to indicate an area size increased by the requested extension size.

2. The method of claim 1, wherein said receiving, acquiring, formatting, and updating are performed while the data entry database is in use.

3. The method of claim 1, wherein any portions of the data storage areas currently holding data are preserved during said formatting and updating.

4. The method of claim 1, further comprising:

before said acquiring, checking for block level sharing; and if block level sharing is detected, notifying other IMS processes to prepare for said acquiring; and after said acquiring, notifying the other IMS processes to commit to said acquiring.

5. The method of claim 1, further comprising:

locking the DMAC during said acquiring; and locking the DMAC during said updating.

6. The method of claim 1, further comprising:

determining if an independent overflow portion of the data storage areas is being extended; and if so, reformatting an existing sequential dependent portion of the data storage areas as an independent overflow portion.

7. The method of claim 1, wherein said updating includes:

creating a working copy of the DMAC;

modifying the working copy of the DMAC; and replacing the DMAC with the working copy of the DMAC.

8. The method of claim 1, wherein said formatting includes:

acquiring one or more format buffers;

formatting the one or more format buffers; and copying the one or more format buffers into the acquired additional storage.

9. The method of claim 1, wherein the operating system is OS/390, and wherein said acquiring includes:

issuing a command to OS/390 via Media Manager to extend the data storage area.

10. A method of extending a sequential dependent portion (SDEP) of an area in a data entry database, the method comprising:

determining an extended SDEP size;

acquiring additional storage from an operating system sufficient to hold an additional number of control intervals;

formatting the acquired additional storage as empty SDEP control intervals; and updating a data entry database areas control list (DMAC) to indicate that the SDEP has the extended SDEP size.

11. The method of claim 10, wherein said determining, acquiring, formatting, and updating are performed while the data entry database is in use.

12. The method of claim 10, wherein a root addressable area (RAA) portion and an independent overflow portion (IOVF) of the area are preserved unaltered during said determining, acquiring, formatting and updating.

13. The method of claim 10, further comprising:

before said acquiring, notifying any other IMS processes engaged in block level sharing with a current IMS process to prepare for said acquiring; and after said acquiring, notifying the other IMS processes to commit to said acquiring.

14. The method of claim 10, further comprising:

locking the DMAC during said acquiring; and locking the DMAC during said updating.

15. A method of extending an independent overflow portion (IOVF) of an area in a data entry database, the method comprising:

determining an extended IOVF size;

if needed, acquiring additional storage from an operating system sufficient to hold an additional number of control intervals;

formatting control intervals between an existing IOVF's end and an extended IOVF's end as empty IOVF-control intervals and, where appropriate, as space map (SMAP) control intervals;

revising a last SMAP control interval in said existing IOVF to indicate any newly addressable IOVF control intervals; and updating a data entry database areas control list (DMAC) to indicate that the IOVF has the extended IOVF size.

16. The method of claim 15, further comprising:

after said formatting, formatting control intervals immediately after the end of the extended IOVF as a reorganization unit of work; and formatting control intervals after the end of the reorganization unit of work as sequential dependent portion (SDEP) control intervals.

17. The method of claim 15, wherein said determining, acquiring, formatting, revising and updating are performed while the data entry database is in use.

18. The method of claim 15, wherein during performance of this method, control intervals storing data in the IOVF are altered only in accordance with normal data entry database activity unrelated to this method.

19. The method of claim 15, further comprising:

before said acquiring, notifying any other IMS processes engaged in block level sharing with a current IMS process to prepare for said acquiring; and after said acquiring, notifying the other IMS processes to commit to said acquiring.

20. The method of claim 15, further comprising:

locking the DMAC during said acquiring; and locking the DMAC during said updating.

21. An information carrier medium that, when engaged in operable relation to a computer system, is configured to communicate to the system a representation of a software program, wherein the software program comprises instructions to extend data storage areas in a data entry database by:

determining a requested extension size;

acquiring additional storage from an operating system sufficient to hold an additional number of control intervals;

formatting the acquired additional storage as data entry database control intervals; and updating a data entry database areas control list (DMAC) to indicate an area size increased by the requested extension size.

22. The medium of claim 21, wherein said receiving, acquiring, formatting, and updating are performed while the data entry database is in use.

23. The medium of claim 21, wherein during of said instructions, control intervals storing data in root addressable area portions (RAA) of the data storage areas and independent overflow portions (IOVF) of the data storage areas are altered only in accordance with normal data entry database activity unrelated to the extension of the data storage areas.

24. The medium of claim 21, wherein the medium is one of a set consisting of a magnetic disk, a magnetic tape, an optical disk, a semiconductor memory, a computer network, a wireless link, and a phone line.

* * * * *